US009378628B2

(12) United States Patent
Johnson et al.

(10) Patent No.: US 9,378,628 B2

(45) Date of Patent: Jun. 28, 2016

(54) SYSTEM AND METHOD OF ALLOWING A PLAYER TO PLAY GAMING MACHINES HAVING EXPANDING SYMBOL AND COLUMN REPLICATION

(71) Applicant: Konami Gaming, Inc., Las Vegas, NV (US)

(72) Inventors: Bradley A. Johnson, Henderson, NV (US); Jason Gilmore, Las Vegas, NV (US)

(73) Assignee: KONAMI GAMING, INC., Las Vegas, NV (US)

( * ) Notice: Subject to any disclaimer, the term of this patent is extended or adjusted under 35 U.S.C. 154(b) by 0 days.

(21) Appl. No.: 14/514,275

(22) Filed: Oct. 14, 2014

(65) Prior Publication Data

US 2015/0302705 A1 Oct. 22, 2015

(30) Foreign Application Priority Data

Apr. 17, 2014 (AU) ................................ 2014202167

(51) Int. Cl.

| | |
|---|---|
| ***A63F 9/24*** | (2006.01) |
| ***A63F 13/00*** | (2014.01) |
| ***G07F 17/34*** | (2006.01) |
| ***G07F 17/32*** | (2006.01) |

(52) U.S. Cl.

CPC .............. *G07F 17/34* (2013.01); *G07F 17/326* (2013.01); *G07F 17/3213* (2013.01)

(58) Field of Classification Search

CPC .... G07F 17/34; G07F 17/3213; G07F 17/326

See application file for complete search history.

(56) References Cited

U.S. PATENT DOCUMENTS

| | | | |
|---|---|---|---|
| 7,278,915 | B2 | 10/2007 | Suganuma |
| 7,824,260 | B2 | 11/2010 | Aida |
| 8,029,354 | B2 | 10/2011 | Saito |
| 8,052,515 | B2 | 11/2011 | Nakamura |
| 8,096,869 | B2 | 1/2012 | Yoshimi |

(Continued)

FOREIGN PATENT DOCUMENTS

| | | | |
|---|---|---|---|
| EP | 2 560 147 | A1 | 2/2013 |
| JP | 2006-296956 | A | 11/2006 |
| JP | 2008-188206 | A | 8/2008 |

OTHER PUBLICATIONS

Patent Examination Report No. 1 (AU 2014256339); Date of Issue: Dec. 18, 2014.

(Continued)

*Primary Examiner* — Steven J Hylinski

(74) *Attorney, Agent, or Firm* — Howard & Howard Attorneys PLLC

(57) ABSTRACT

The invention is directed to a gaming machine and method of providing a game. The game machine comprises a display and a controller. The display is configured to display a plurality of symbol positions displayed in a grid, the grid defining a plurality of columns. The controller is configured to: initiate a game; determine at least one symbol associated with each of the plurality of symbol positions along at least one of the columns and display the symbols in the at least one column; evaluate the symbols displayed within the at least one column to determine a highest ranked symbol; replace all remaining symbols displayed within the at least one column with the highest ranked symbol; and insert the highest ranked symbol into the symbol positions of at least one other column within the grid.

17 Claims, 8 Drawing Sheets

(56) References Cited

U.S. PATENT DOCUMENTS

| | | | |
|---|---|---|---|
| 8,287,359 B2 | 10/2012 | Nakamura | |
| 8,303,397 B2 | 11/2012 | Mizue | |
| 8,388,435 B2 | 3/2013 | Anderson et al. | |
| 2008/0188286 A1 | 8/2008 | Jaffe | |
| 2009/0061984 A1 | 3/2009 | Yi | |
| 2009/0111571 A1 | 4/2009 | Nakamura et al. | |
| 2010/0016061 A1 | 1/2010 | Gomez et al. | |
| 2011/0223985 A1 | 9/2011 | Mizue | |
| 2012/0157181 A1 | 6/2012 | Jensen et al. | |
| 2014/0094248 A1 | 4/2014 | Vancura | |
| 2014/0274294 A1* | 9/2014 | Baerlocher et al. | 463/20 |

OTHER PUBLICATIONS

Patent Examination Report No. 1 (AU 2014202167); Date of Issue: Jun. 10, 2014.

Notice of Reasons for Rejection with English Translation (JP 2014-216168); Dispatched Jan. 26, 2016.

* cited by examiner

SYSTEM AND METHOD OF ALLOWING A PLAYER TO PLAY GAMING MACHINES HAVING EXPANDING SYMBOL AND COLUMN REPLICATION

CROSS REFERENCE TO RELATED APPLICATION

This application claims priority to Australian Patent Application No. 2014202167, filed Apr. 17, 2014, the disclosure of which is hereby incorporated by reference in its entirety.

COPYRIGHT NOTICE

A portion of this disclosure contains material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

TECHNICAL FIELD

The invention generally relates to gaming machines and more particularly, to an apparatus and method for allowing players to play gaming machines having expanding symbol and column replication.

BACKGROUND OF THE INVENTION

Gaming machines, such as slot machines, are a cornerstone of the gaming industry. At least some known gaming machines include a video display device to display a reel game that includes a plurality of reels, wherein each reel includes a plurality of symbols. During game play, the gaming machine accepts a wager from a player, the player selects one or more paylines, the gaming machine spins the reels, and sequentially stops each reel to display the generated combination of symbols on the reels. The gaming machine then awards the player an award based on the combination of symbols orientated along the selected payline.

Some known gaming machines have a plurality of symbols displayed on their reels and utilize one unified pattern over the course of gameplay. This unified pattern progresses over time in order to provide interactive gameplay to the player. Further, additional symbols may be used in order to alter this pattern over time based on certain triggers in a game.

The present invention is aimed at one or more of the problems identified above.

BRIEF SUMMARY OF INVENTION

In one aspect of the present invention, a game machine is provided. The game machine comprises a display and a controller. The display is configured to display a plurality of symbol positions displayed in a grid, the grid defining a plurality of columns. The controller is configured to: initiate a game; determine at least one symbol associated with each of the plurality of symbol positions along at least one of the columns and display the symbols in the at least one column; evaluate the symbols displayed within the at least one column to determine a highest ranked symbol; replace all remaining symbols displayed within the at least one column with the highest ranked symbol; and insert the highest ranked symbol into the symbol positions of at least one other column within the grid.

In another aspect of the present invention, a method of implementing a game machine including a display and a controller is provided. The display is configured to display a plurality of symbol positions displayed in a grid, the grid defining a plurality of columns. The method includes the steps of: initiating a game; determining at least one symbol associated with each of the plurality of symbol positions along at least one of the columns; displaying the symbols in the at least one column; evaluating the symbols displayed within the at least one column to determine a highest ranked symbol; replacing all remaining symbols displayed within the at least one column with the highest ranked symbol; and inserting the highest ranked symbol into the symbol positions of at least one other column within the grid.

In another aspect of the present invention, a non-transitory information recording medium containing a computer readable program that functions as a game machine is provided. The machine comprises a display and a controller. The display is configured to display a plurality of symbol positions displayed in a grid, the grid defining a plurality of columns. The controller is configured to: initiate a game; determine at least one symbol associated with each of the plurality of symbol positions along at least one of the columns and display the symbols in the at least one column; evaluate the symbols displayed within the at least one column to determine a highest ranked symbol; replace all remaining symbols displayed within the at least one column with the highest ranked symbol; and insert the highest ranked symbol into the symbol positions of at least one other column within the grid.

BRIEF DESCRIPTION OF THE DRAWINGS

Other advantages of the present invention will be readily appreciated as the same becomes better understood by reference to the following detailed description when considered in connection with the accompanying drawings.

Corresponding reference characters indicate corresponding parts throughout the drawings.

DETAILED DESCRIPTION OF THE INVENTION

Figure 1:
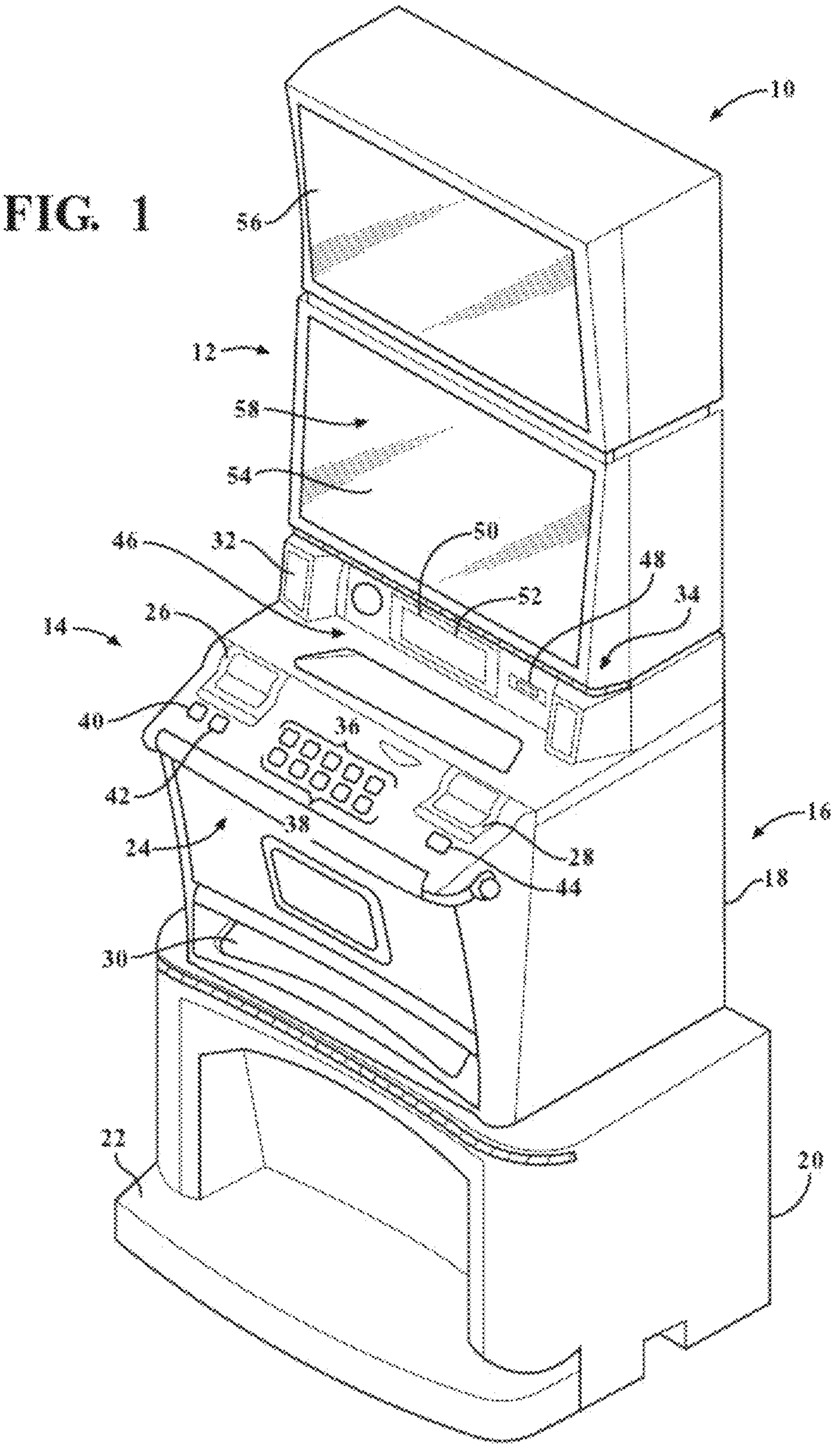
FIG. 1 is a perspective view of an exemplary gaming machine for use in the system of FIG. 1.

With reference to the drawings and in operation, the present invention overcomes at least some of the disadvantages of known gaming machines by providing a step-based and multiple-pattern game play sequence over the course of a game. More specifically, the gaming machine determines a series of intervals based on a predetermined game trigger. The game machine will then proceed to alter at least two separate sets of symbol patterns over the course of these intervals. These changes involve equal increases and decreases of gaming symbols and symbol types 88 and can alternatively involve overriding symbol positions or maintaining certain symbol positions over the course of these predetermined intervals. This creates a more interactive and randomized game experience, enhancing the player's expectation for achieving a win and the improving the enjoyment of the game. Thus, the amount of time that the game is played by patrons of a gaming establishment is increased.

In general, the gaming machine 10 allows a player to initiate a gaming session to play a plurality of video slot games via the gaming machine 10. The gaming machine 10 displays a game, accepts a wager on the game, generates a game outcome including a plurality of gaming symbols 88 at a plurality of symbol positions 112, and provides an award to the player if a winning combination is displayed in the generated game outcome. During play of the game, the gaming machine 10 detects a particular trigger condition and generates a particular number of game intervals in relation to that trigger. Those intervals are then established on the game machine prior to continuing any game play on the game machine 10. Then, the machine determines the initial number of symbols or symbol types 88 that are must change over the course of the intervals determined by the game machine 10. The game machine 10 then proceeds through the first interval using a pattern for each reel in play, utilizing at least two different patterns for all reels 98 currently in use. After the first interval, the gaming machine 10 will then change the amount of the gaming symbols or symbol types 88 within the reels 98 by increasing and/or decreasing certain symbols or symbol types 88 along the reels 98. The symbol position 112 held by the game symbol 88 may also be altered along the reels 98. The final patterns are then maintained after the first interval is finished and until the end of the particular segment of game play.

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Gaming Machine

Figure 2:
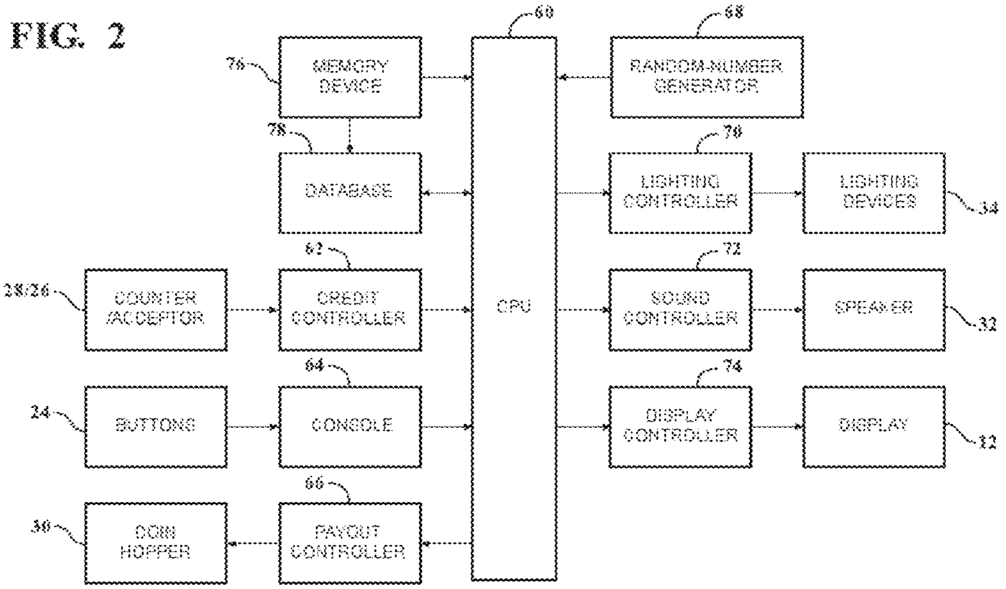
FIG. 2 is a schematic showing the structure of the gaming machine shown in FIG. 1.

FIG. 1 is a perspective view of an exemplary gaming machine 10. FIG. 2 is a schematic representation of the gaming machine 10. A preferred embodiment of the present invention is a video gaming machine preferably installed in a casino. In the illustrated embodiment, the gaming machine 10 includes a display device 12 for displaying a plurality of games, a user input device 14 to enable a player to interface with the gaming machine 10, and a gaming controller 16 that is operatively coupled to the display device 12 and the user input device 14 to enable a player to play games displayed on the display device 12. The gaming machine 10 also includes a cabinet assembly 18 that is configured to support the display device 12, the user input device 14, and/or the gaming controller 16 from a gaming stand 20 and/or a supporting surface 22.

The display device 12 and the user input device 14 are coupled to the cabinet assembly 18 and are accessible by the player. In one embodiment, the gaming controller 16 is positioned within the cabinet assembly 18. Alternatively, the gaming controller 16 may be separated from the cabinet assembly 18, and connected to components of the gaming machine 10 through a network such as, for example, a local area network (LAN), a wide area network (WAN), dial-in-connections, cable modems, wireless modems, and/or special high-speed Integrated Services Digital Network (ISDN) lines.

In one embodiment, the user input device 14 includes a plurality of input buttons 24, a coin slot 26, and/or a bill acceptor 28. The coin slot 26 includes an opening that is configured to receive coins and/or tokens deposited by the player into the gaming machine 10. The gaming machine 10 converts a value of the coins and/or tokens to a corresponding amount of gaming credits that are used by the player to wager on games played on the gaming machine 10.

The bill acceptor 28 includes an input and output device that is configured to accept a bill, a ticket, and/or a cash card into the bill acceptor 28 to enable an amount of gaming credits associated with a monetary value of the bills, ticket, and/or cash card to be credited to the gaming machine 10. Moreover, the gaming machine 10 may also utilize a cashless wagering system (not shown), such as a ticket in ticket out (TITO) system (not shown). In one embodiment, the bill acceptor 28 also includes a printer (not shown) that is configured to dispense a printed voucher ticket that includes information indicative of an amount of credits and/or money paid out to the player by the gaming machine 10 during a gaming session. The voucher ticket may be used at other gaming machines, or redeemed for cash, and/or other items as part of a casino cashless system (not shown).

A coin tray 30 is coupled to the cabinet assembly 18 and is configured to receive a plurality of coins that are dispensed from the gaming machine 10. One or more speakers 32 are installed inside the cabinet assembly 18 to generate voice announcements and/or sound effects associated with game play. The gaming machine 10 also includes one or more lighting devices 34 that are configured to blink and/or change brightness and color in specific patterns to produce lighting effects to enhance a visual gaming experience for the player.

In one embodiment, the input buttons 24 include a plurality of BET switches 36 for inputting a wager on a game, a plurality of selection switches 38 for selecting a betting line and/or card, a MAXBET switch 40 for inputting a maximum wager, a PAYOUT switch 42 for ending a gaming session and dispensing accumulated gaming credits to the player, and a start switch, i.e., a SPIN/DEAL button 44 to initiate an output of a game.

In the illustrated embodiment, the BET switches 36 include five switches from 1BET to 5BET to enable a player to wager between a minimum bet up to 5× minimum bet. Each selection switch 38 corresponds to a betting line such as, for example, a payline and/or symbol for a reel game, one or more cards for a card game, and/or a symbol for a roulette game, to enable a player to associate a wager with one or more betting lines. The MAXBET switch 40 enables a player to input the maximum bet that a player can spend against one time of a game. The PAYOUT switch 42 enables a player to receive the amount of money and/or credits awarded to the player during a gaming session, which has been credited onto the gaming machine 10.

The gaming machine 10 may also include a player tracking device 46 that is coupled to the gaming controller 16 for identifying the player and/or a player tracking account that is associated with the player. The player tracking account may include, but is not limited to, gaming credits available to the player for use in playing the gaming machine 10. The player tracking device 46 is configured to communicate player account information between a player tracking controller (not shown) and the gaming machine 10. For example, the player tracking device 46 may be used to track bonus points and/or credits awarded to the player during a gaming session and/or track bonus and/or credits downloaded to the gaming machine 10 from the player tracking system.

The player tracking device 46 is coupled to the gaming cabinet assembly 18 and includes a player identification card reader 48, a data display 50, and a keypad 52. The player identification card reader 48 is configured to accept a player tracking card (not shown) inserted by the player, and read information contained on the player tracking card to identify the player account information. The player identification card reader 48 may include, but is not limited to, a barcode reader, a magnetic card reader, and/or a radio frequency identification (RFID) card reader. The keypad 52 is configured to accept a user selection input such as, for example, a unique player personal identification number (PIN) to facilitate enabling the gaming machine 10 to identify the player, and access player account information associated with the identified player to be displayed on the data display 50. In one embodiment, the data display 50 includes a touchscreen panel that includes the keypad 52. Alternatively, the data display 50 and the keypad 52 may be included in the display device 12.

In one embodiment, the display device 12 includes a first display 54 and a second display 56. The first display 54 is configured to display a game screen 58 (shown in FIG. 3) including indicia and/or symbols for use in a game, e.g., cards used by a card game, roulette wheel and symbols used in a roulette game, and reels used in a reel game. The game screen 58 may include any type of game including, but not limited to, a video slot game, a keno game, a blackjack game, a video poker game, or any type of game which allows a player to make a wager, play a game, and potentially provide the player an award based on an outcome of the game and a paytable. The second display 56 is configured to display game play instructions for performing the game including, but not limited to, playing instructions, paytables, paylines, betting lines and/or any other information to enable the gaming machine 10 to function as described herein. Moreover, each display 54 and 56 may be configured to display at least a portion of the game screen 58 and/or game play instructions. In one embodiment, the first and second displays 54 and 56 each include a flat panel display, such as a cathode ray tube display (CRT), a liquid crystal display (LCD), a light-emitting diode display (LED), a plasma display, and/or any suitable visual output device capable of displaying graphical data and/or text to a user. Alternatively, a single component, such as a touch screen, may function as both the display device 12 and as the user input device 14. In an alternative embodiment, the first display 54 and/or the second display 56 includes a plurality of mechanical reels displaying a plurality of game symbols.

Referring to FIG. 2, in one embodiment, the gaming controller 16 includes a processor, i.e., a central processing unit (CPU) 60, a credit controller 62, a console unit 64, a payout controller 66, a random-number generator (RNG) 68, a lighting controller 70, a sound controller 72, a display controller 74, a memory device 76, and a database 78. Memory device 76 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the CPU 60 to store, retrieve, and/or execute instructions and/or data.

The CPU 60 executes various programs, and thereby controls other components of the gaming controller 16 according to player instructions and data accepted by the user input device 14. The CPU 60 in particular executes a game program, and thereby conducts a game in accordance with the embodiments described herein. The memory device 76 stores programs and databases used by the CPU 60. Moreover, the memory device 76 stores and retrieves information in the database 78 including, but not limited to, a game type, a number of reels associated with a game, a number of reel strips associated with each reel, a number of symbol positions being displayed on each reel strip, a type of symbols being displayed on each symbol position, a predefined set of normal symbols, a predefined set of special symbols, image data for producing game images and/or screens on the display device 12, and temporarily stores variables, parameters, and the like that are used by the CPU 60. In addition, the memory device 76 stores indicia, symbol weights, pay tables, and/or winning combination tables which represent relationships between combinations of random numbers and types of awards. In one embodiment, the memory device 76 utilizes RAM to temporarily store programs and data necessary for the progress of the game, and EPROM to store, in advance, programs and data for controlling basic operation of the gaming machine 10, such as the booting operation thereof.

The credit controller 62 manages the amount of player's credits, which is equivalent to the amount of coins and bills counted and validated by the bill acceptor 28. The console unit 64 is coupled to the user input device 14 to monitor player selections received through the input buttons 24, and accept various instructions and data that a player enters through the input buttons 24. The payout controller 66 converts a player's credits to coins, bills, or other monetary data by using the coin tray 30 and/or for use in dispensing a credit voucher via the bill acceptor 28.

The lighting controller 70 controls one or more lighting devices 34 to blink and/or change brightness and color in specific patterns in order to produces lighting effects associated with game play. The sound controller 72 controls the speakers 32 to output voice announcements and sound effects during game play. The display controller 74 controls the display device 12 to display various images on screens preferably by using computer graphics and image data stored in the memory device 76. More specifically, the display controller 74 controls video reels in a game screen displayed on the first display 54 and/or the second display 56 by using computer graphics and the image data.

The RNG 68 generates and outputs random numbers to the CPU 60 preferably at the start of each round of game. The CPU 60 uses the random numbers to determine an outcome of a game. For example, if the game is a video slot game, the CPU 60 uses the RNG 68 to randomly select an arrangement of symbols to be displayed on video reels. Moreover, the CPU 60 generally uses random numbers generated by the RNG 68 to play the games, and to determine whether or not to provide an award to a player. In addition, the CPU 60 generates game outcomes including combinations of random numbers, and compares the generated combinations with winning combinations stored in the winning combination table to determine if the generated outcome is a winning outcome that is associated with a type of award.

Figure 3:
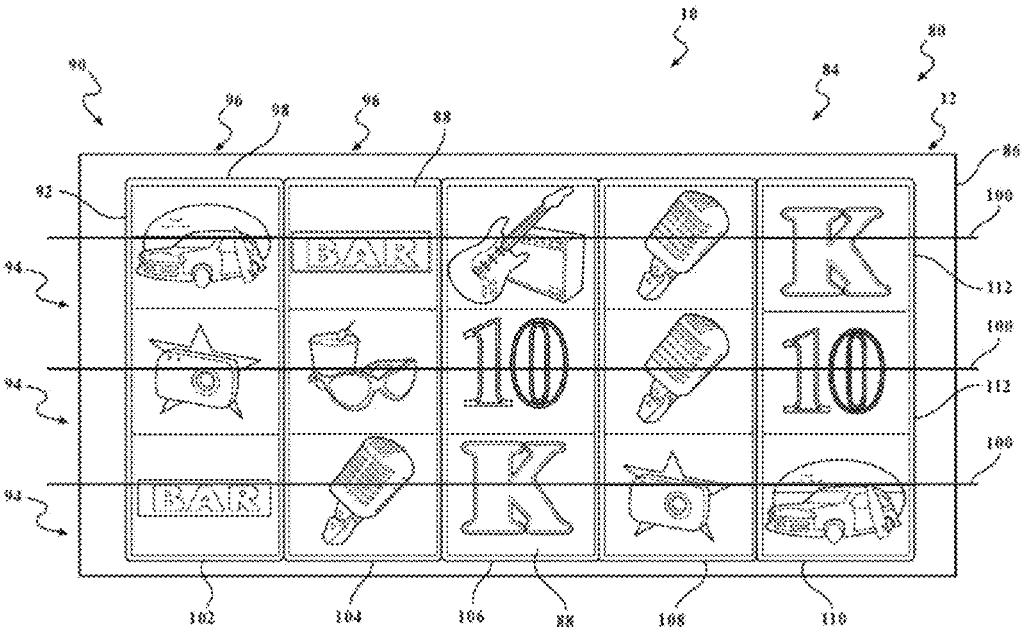
FIG. 3 is a graphical display of a video slot game including a plurality of reels, according to an embodiment of the present invention.
Figure 4:
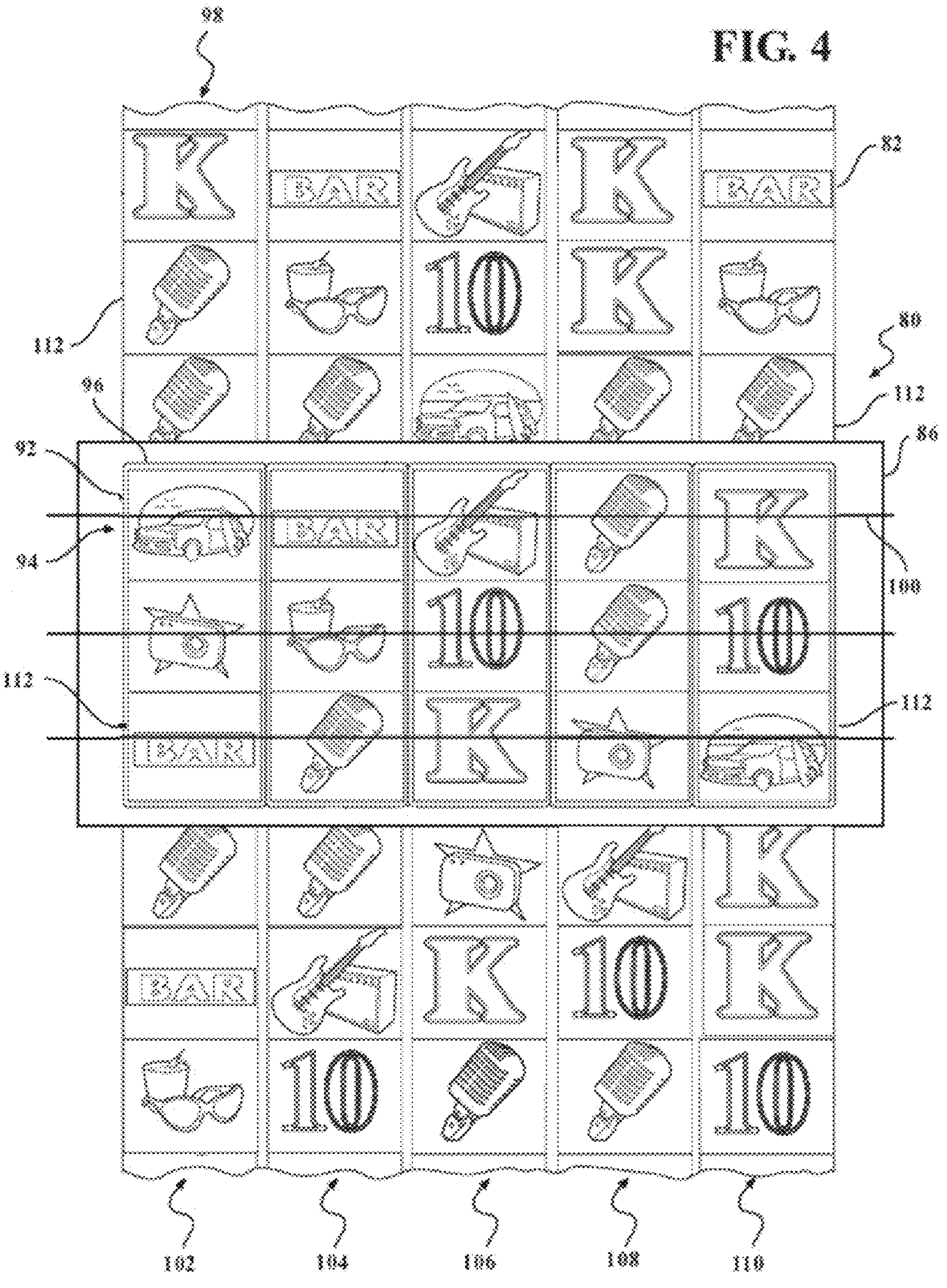
FIG. 4 is a schematic representation of a plurality of reel strips that may be used with at least one slot reel of the video slot game of FIGS. 3 and 4, according to an embodiment of the present invention.
Figure 5:
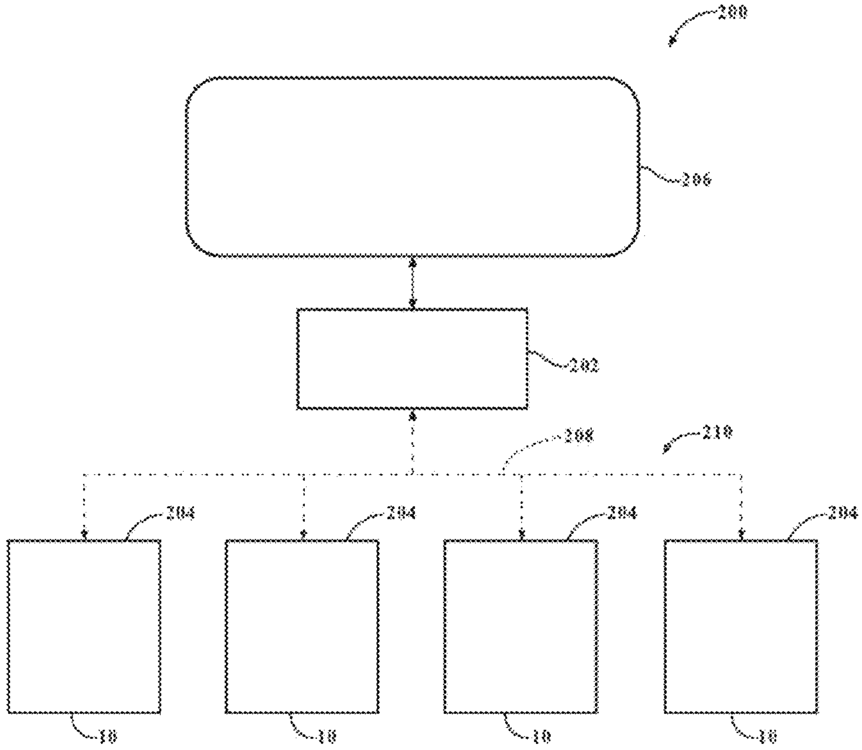
FIG. 5 is a schematic view of an exemplary gaming system of the present invention.

FIG. 3 is an exemplary graphical display of a game 80 that is displayed by the gaming machine 10 shown in FIG. 1. FIG. 4 is a schematic representation of a portion of the gaming machine 10 including the game 80. In the illustrated embodiment, the gaming controller 16 is configured to display the game 80 on the display device 12. In one embodiment, the game 80 is a video slot game. However, it should be noted that the game 80 may be any type of game upon which a player could make a wager including, but not limited to a keno game, a blackjack game, a video poker game, or any type of game that enables the gaming machine 10 to function as described herein. In the illustrated embodiment, the game 80 is displayed on the first display 54. Alternatively, the game 80 may be displayed on the first display 54 and/or the second display 56.

In general, during play of the main game 80, the gaming controller 16 randomly generates an outcome 84 of the main game 80 and displays the generated game outcome 84 in a display area 86. The gaming controller 16 randomly selects a plurality of game symbols 88 from a predefined set of possible game symbols and displays the selected game symbols 88 associated with the generated game outcome 84 in the game display area 86.

In the illustrated embodiment, the plurality of game symbols 88 are displayed in a grid 90 having a plurality of cells 92 arranged along a plurality of rows 94 and a plurality of columns 96. Each cell 92 displays one or more game symbols 88 associated with the game outcome 84. In the illustrated embodiment, the gaming controller 16 displays the game symbols 88 within a plurality of reels 98. Each reel 98 is associated with a corresponding column 96. The main game 80, in one embodiment, includes 5 reels 98 with 3 cells 92 displayed in the display area 86 per reel 98 (a "3×5" arrangement). Alternatively, other reel arrangements may be used such as, for example, 4, 5, 5, 5, and 4 cells per reel, respectively (a "4-5-5-5-4" arrangement), 3-4-3-4-3, or 4-5-4-5-4 arrangements or arrangements with the same number of cells per column, such as 3×3, 3×4, 4×5, or 5×5 configurations. The main game 80 also includes a plurality of paylines 100 that extend across one or more cells 92 to indicate, to the player, a combination of game symbols 88. In one embodiment, the gaming machine 10 displays the main game 80 via a plurality of mechanical reels (not shown) that include a plurality of symbols displayed on a circumferential surface of each reel.

Each slot game is generally played in a conventional manner. The player makes a wager, which may be based on a predetermined denomination and a selected number of paylines, the gaming controller 16 randomly generates an outcome for the game, spins the reels, and selectively stops the reels to display a game symbol 88 in each of the display cells 92. If a predetermined pattern of symbols 88 is randomly chosen for each cell 92 associated with a played payline 100, the player may be awarded a payout based on the payline, the wager, and a predetermined paytable. Moreover, the player may be awarded a payout if the combination of symbols associated with a selected payline is a winning combination. In addition, a player may receive a bonus feature and/or a bonus game based on the combination of symbols associated with the selected payline and/or the appearance of one or more predefined symbols in the game outcome 84. Many variations to the above described general play of a slot game fall within the scope of the present invention. Such slot games are well-known in the art, and are therefore not further discussed.

In the illustrated embodiment, the gaming machine 10 receives a signal, from the user input device 14, that is indicative of a player's selection to initiate a gaming session including a wager amount, and a selection of one or more paylines 100 associated with a predefined set of cells 92 within the displayed grid 90. In the illustrated embodiment, the gaming machine 10 is a multi-line game, i.e., the paylines include horizontal paylines and/or diagonal pay-lines, and/or zig-zag paylines. Moreover, the user input device 14 may allow the player to toggle to increase the bet per payline a credit at a time (up to the maximum bet). The gaming controller 16 randomly generates an outcome of the main game 80, and displays the generated outcome on the display device 12. In one embodiment, the gaming controller 16 is configured to rotate, and/or spin each reel 98 to initiate a game play, and stop each reel 98 to display a plurality of symbols 88 associated with the randomly generated outcome. In addition, the gaming controller 16 is adapted to determine if the generated outcome is a winning outcome based on the displayed game symbols 88, a pay-table, a wager, and one or more selected paylines 100. More specifically, the gaming machine 10 determines if a combination of symbols 88 arranged along the selected payline 100 is a winning combination. The gaming controller 16 may provide an award in response to the outcome of the main game 80. In general, the term "award" may be a payout, in terms of credits or money. Thus, gaming controller 16 may award a regular payout in response to the outcome of the main game 80. However, it should be noted that the term award may also refer to other types of awards, including, prizes, e.g., meals, show tickets, etc. . . . , as well as in-game awards, such as free games or awarding the player one or more wild symbols or stacked wild symbols in each of the games.

The gaming controller 16 is configured to display the game 80 including a plurality of reels 98. For example, in one embodiment, the gaming controller 16 displays the game 80 having five reels 98 orientated horizontally including a 1$^{st}$ reel 102, a 2$^{nd}$ reel 104, a 3$^{rd}$ reel 106, a 4$^{th}$ reel 108, and a 5$^{th}$ reel 110. Each reel 98 may have a plurality of associated reel strips 82 that may be displayed on the respective reels 98. Each reel strip 82 includes a plurality of symbol positions 112. During display of the generated game outcome 84, the gaming controller 16 selects a reel strip 82 to be displayed on at least one of the reels 98, selects a plurality of game symbols 88 being displayed in each of the symbol positions 112 of each selected reel strip 82, and spins each reel 98 such that the game symbols 88 are moved through each of the cells 92 in the display area 86.

The illustrated embodiment can also include a bonus feature or secondary game in addition to the main game 80 on the gaming machine 10. The bonus feature or secondary game is an add-on to the main game 80 utilizing any in-game machine asset (discussed in more detail below). A bonus feature or secondary game is considered an add-on to the main game 80 that occurs during game play. The bonus feature or secondary game can used any in-game machine asset that is used to display an award related to the main game 80. Such awards include free spins, credits, a credit multiplier, or additional pseudo game-play unrelated to the main game 80. The bonus feature or secondary game can be in any of the wagering or non-wagering formats as described above (slots, video poker, etc.). A bonus feature or secondary game may also be similar to the main game 80 through the use of additional random numbers in order to continue randomized, wager-based game play. A bonus feature or secondary game may include any additional game play and grant awards based on any particularized triggers built into the main game 80 of the gaming machine 10. It should be noted that the game may only include the main game 80. Alternatively, the game may include the main game 80 and one or more bonus features and/or one or more secondary games. It should be noted that the present invention is not limited to any specific bonus feature or secondary game (or type thereof). Exemplary bonus features or secondary games are disclosed in U.S. Pat. No. 7,824,260, U.S. Pat. No. 8,052,515, U.S. Pat. No. 8,096,869, U.S. Pat. No. 8,303,397, and United States Patent Application Publication 2011/0223985, all of which are hereby incorporated by reference.

Figure 8:
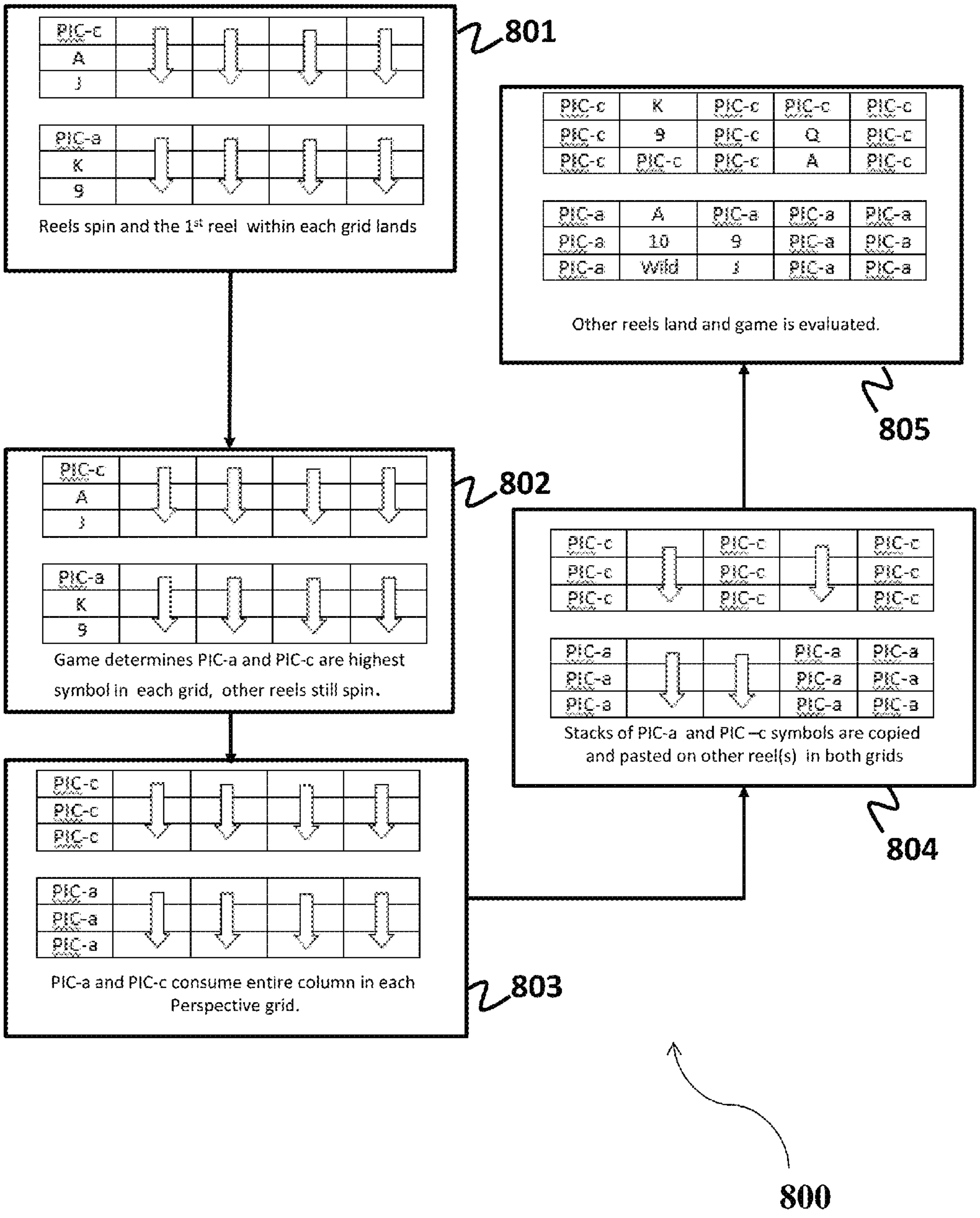
FIG. 8 is a flowchart of another exemplary method of allowing a player to play a gaming machine, according to an embodiment of the present invention.

FIG. 8 is a schematic view of an exemplary gaming system 200. The gaming system 200 includes a system controller 202 and one or more gaming terminals 204 that are coupled to the system controller 202. The gaming system 200 may also include a central display 206 that is coupled to the system controller 202 for displaying games played on one or more of the gaming machines 10. In one embodiment, the gaming terminal 204 includes the gaming machine 10. In another embodiment, gaming terminal 204 may include a personal computer, laptop, cell phone, smartphone, tablet computer, personal data assistant, and/or any suitable computing device that enables a player to connect to system controller 202 to play the game 80.

In the illustrated embodiment, the gaming machines 10 and the system controller 202 are coupled in communication with a local area network (LAN) 208. Alternatively, the gaming machines 10 and the system controller 202 may be coupled via a network such as, for example, an Internet link, an intranet, a WAN, dial-in-connections, cable modems, wireless modems, and/or ISDN lines. In the illustrated embodiment, the gaming system 200 includes four gaming machines 10, which in one embodiment as shown in FIG. 9 are arranged in a bank 210, i.e., are arranged together, adjacently. It should be noted, however, that the gaming system 200 may include any number of gaming machines 10 that may be arranged in any manner, such as in a circle or along a curved arc, or positioned within separate areas of a casino floor, and/or separate gaming establishments such as different casinos. Furthermore, additional groups of gaming machines 10 may be coupled to the system controller 202. In one embodiment, the system controller 202 may be implemented by one of the gaming controllers 16 associated with a gaming machine 10. In still another embodiment, the system controller 202 may be located remotely with respect to gaming machines 10, or within one of the gaming machine cabinet assemblies 18 (shown in FIG. 1). The system controller 202 is configured to perform all of the functions of the gaming controller 16 as described herein.

In the illustrated embodiment, the system controller 202 determines if a triggering event occurs in a game outcome being played at one or more of the gaming machines 10, and displays a bonus game such as, for example, the game 80 on the central display 206 if the triggering event occurs. Alternatively, the system controller 202 may display the game 80 at one or more gaming machines 10 based on one or more triggering events occurring in games played at the gaming machines 10. The triggering event may be the appearance of a predefined symbol and/or a predefined symbol combination in a game outcome.

Referring to FIGS. 8 and 4, during play of the game 80, the system controller 202 determines a number of game outcomes, i.e., free spins that will be displayed based at least in part on the triggering event. The system controller 202 displays, for each bonus game 80, at least one reel 98 having a plurality of reel strips 82.

Expanding Symbol and Column Replication

In another embodiment of the present invention, the gaming machine 10 comprises a display device 12 and a gaming controller 16. The display device 12 is configured to display a plurality of symbol positions 112 displayed in a grid 90, the grid 90 defining a plurality of columns 96. The gaming controller 16 is configured to: initiate a game 80; determine at least one symbol 88 associated with each of the plurality of symbol positions 112 along at least one of the columns 96 and display the symbols 88 in the at least one column 96; evaluate the symbols 88 displayed within the at least one the columns 96 to determine a highest ranked symbol; replace all remaining symbols 88 displayed within the at least one column with the highest ranked symbol; and insert the highest ranked symbol into the symbol positions 112 of at least one other column 96 within the grid 90.

In another embodiment of the present invention, the symbols 88 within the grid 90 are selected from a subset of available symbols. The subset of available symbols may be all symbols 88 available to the gaming controller 16 during a main game or a special subset that is only accessible for the expanding and replication of symbols.

In another embodiment of the present invention, the symbol ranking is predetermined as a function of the symbol's 88 number or suit. The ranking can follow any preprogrammed ranking established within the gaming machine 10 in order to play the game 80.

In another embodiment of the present invention, the symbol ranking is dynamically allocated. As non-limiting examples, the dynamic allocation can occur in response to a trigger condition, after every spin, or upon the initiating of a new game by the player. Such a trigger condition may include a predetermined combination of game symbols 88, a predetermined signal from the gaming controller 16 or the system controller 202, or any non-limiting combination of these elements. Dynamically allocating the symbol ranking can allow the gaming machine 10 to utilize multiple ranking schemes and therefore change the mechanics of game play.

Figure 7:
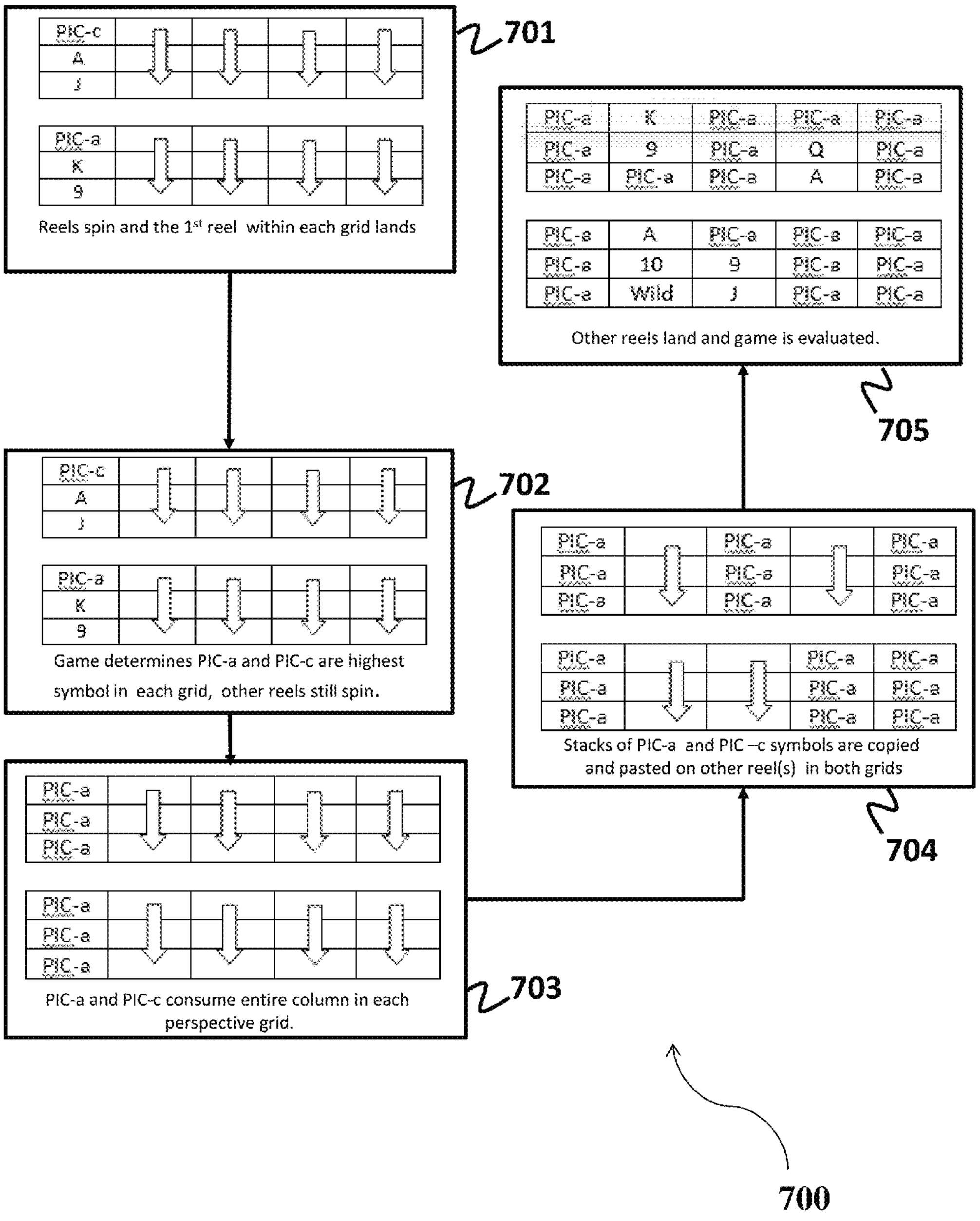
FIG. 7 is a flowchart of another exemplary method of allowing a player to play a gaming machine, according to an embodiment of the present invention.

In another embodiment of the present invention, the display device 12 further includes a second grid of symbol positions 112, the second grid defining a second plurality of columns 96, the gaming controller 16 further configured to: insert the highest ranked symbol into one of the columns 96 of the second grid, the one of the columns 96 of the second grid corresponding with one of the columns 96 of the first grid. As shown in FIG. 7, multiple grids may also be used determine a highest ranked symbol: where the highest ranked symbol is then copied into appropriate columns within both grids. In this embodiment, the highest ranked symbol within each grid is compared in order to determine the highest ranked game symbol 88 overall. That highest ranked symbol is then replicated into every symbol position 112 within the column of each grid. The game then proceeds to duplicate those columns into other columns within the perspective grids. The duplication can occur in one to more other columns, allowing the remaining reels to finish spinning and complete the remainder of the grids and determine a payout.

In another embodiment of the present invention, the gaming controller 16 is further configured to determine the highest ranked symbol 88 within each perspective grid 90 in order to replicate each highest ranked symbol 88 independently within each grid 90. The gaming controller 16 first determines the symbols 88 displayed within the second grid along a first column 96. Then, the gaming controller 16 evaluates the symbols 88 displayed within the first column of the second grid to determine the highest ranked symbol in the first column of the second grid. The gaming controller 16 then replaces all remaining symbols displayed within the first column 96 of the second grid 90 with the highest ranked symbol 88 in the first column 96 of the second grid 90. The gaming controller 16 then finally replaces at least one additional column in the second grid 90 with the highest ranked symbol 88 in the first column 96 of the second grid 90. It should be noted that unlike the embodiment above, the gaming controller 16 is independently determining the highest ranked symbol and proceeding through the replication for the highest ranked symbol 88 for the first grid simultaneously. The gaming machine 10 completes the grid of symbols in both the first grid and the second grid and evaluates the game result. As shown in FIG. 8, a gaming machine 10 may have multiple grids 90 that act independently of each other and go through the same steps outlined in FIG. 6 independently of each other in response to the same trigger condition. This generates distinct high-ranked symbols and duplication patterns in each grid that are then used to determine paylines and payouts to the current player.

In another embodiment of the present invention, the gaming controller 16 is further configured to replace at least one additional column within the second grid with the highest ranked symbol in the first column of the first grid. This embodiment includes the ability of copying the highest ranked symbol of all grids presented on the display device 12 into all other symbol positions and columns presented during game play. In this particular embodiment, dependent grids can take the highest ranked symbol 88 from any of the active grids 90 and proceed to expand into multiple columns. This replication of the highest ranked symbol can include every column and symbol position 112 within the second grid dependent on the trigger condition and/or game mechanics currently in play.

In another embodiment of the present invention, the gaming controller 16 is further configured to replace at least one additional column within the second grid with the highest ranked symbol in the first column of the first grid.

Figure 6:
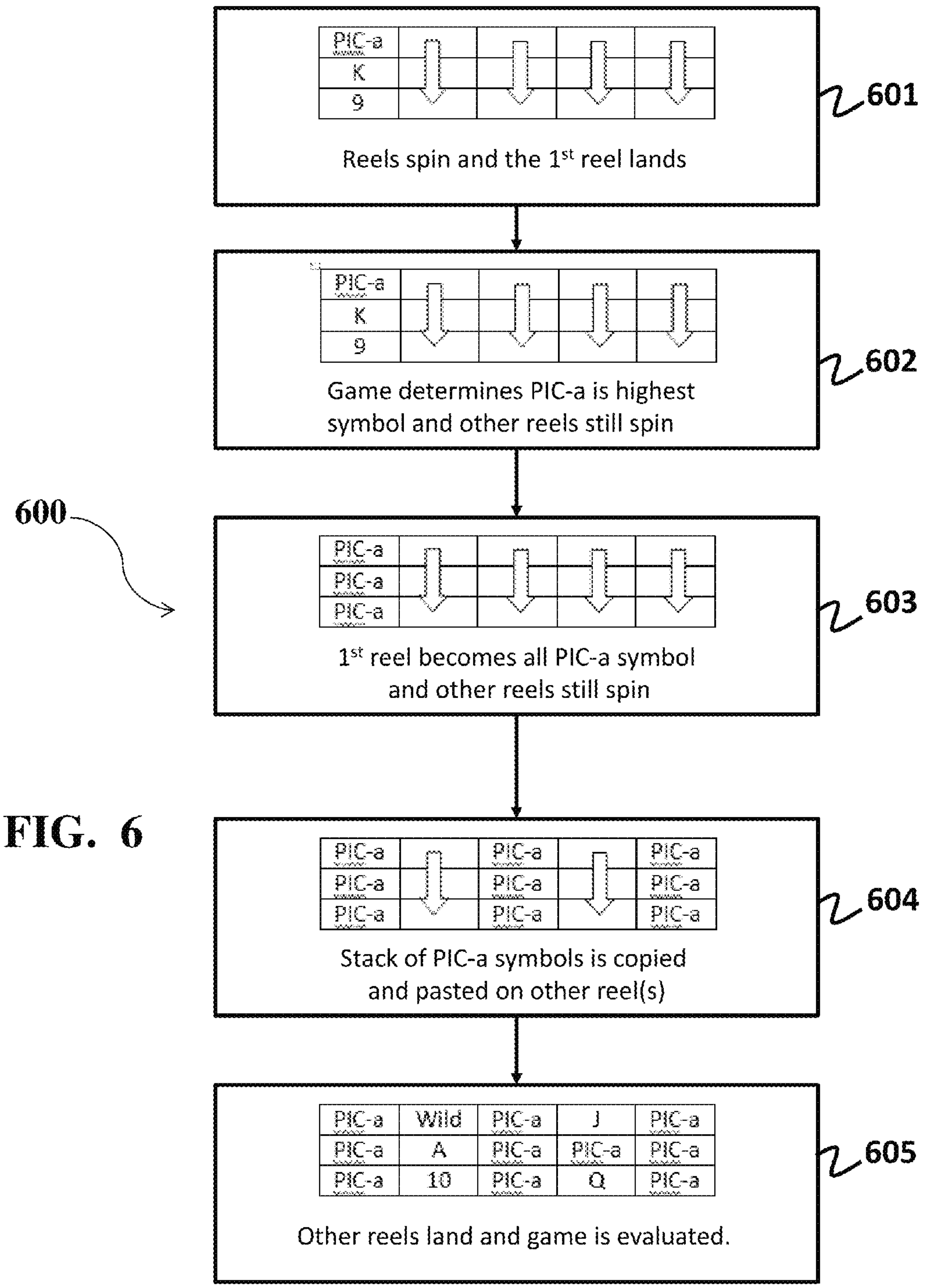
FIG. 6 is a flowchart of an exemplary method of allowing a player to play a gaming machine, according to an embodiment of the present invention.

In another aspect of the present invention, represented within FIG. 6, a method 600 of implementing a gaming machine 10 including a display device 12 and a gaming controller 16 is provided. The display device 12 is configured to display a plurality of symbol positions displayed in a grid, the grid defining a plurality of columns. The method 600 includes the steps of: initiating a game; determining a least one symbol associated with each of the plurality of symbol positions along at least one of the columns; displaying the symbols in the at least one column; evaluating the symbols displayed within the at least one the columns to determine a highest ranked symbol; replacing all remaining symbols displayed within the at least one column with the highest ranked symbol; and inserting the highest ranked symbol into the symbol positions of at least one other column within the grid.

Further referring to FIG. 6, the method 600 of expanding replication of symbols 88 and columns 96 is illustrated. The gaming machine 10 begins in regular gameplay with a player as described in the sections above. A game trigger may be used in order to initialize the method at step 601. The trigger can be the activation of the machine through the display device 12, the coin slot 26, the bill acceptor 28, or through the buttons 24. The trigger may also be an in-game feature based on a particular combination of symbols 88 predetermined within the gaming machine 10. Finally, the trigger may also be a system trigger through the system controller 202 in communication with the gaming machines 10. Through receipt of any of the trigger signals discussed, the gaming machine 10 will initiate the expanding symbol and column replication method.

Furthermore, at step 601, the initiation of the game 80 is marked by at least one of the reels 98 stopping in order to show the symbols 88 within the symbol position 112 present within the grid 90. The at least one real selected to stop may be any one of reels 98 from reel 102 (the first, left-more reel) through 5$^{th}$ reel 110. The method 600 determines a least one symbol 88 associated with each of the plurality of symbol positions 112 along at least one of the columns 96.

Then, at step 602, the method 600 displays the symbols 88 in the at least one column and then evaluates the symbols displayed within the at least one the columns to determine a highest ranked symbol. The determination of the highest ranked symbol may be based on number or suite depending on the programming of the method and particular game mechanics currently used during game play.

Then, at step 603, the method 600 replaces all remaining symbols displayed within the at least one column with the highest ranked symbol. This then creates a column with the same highest-ranked symbol in every symbol position 112 within the grid 90.

Then, at step 604, the method 600 inserts the highest ranked symbol into the symbol positions of at least one other column within the grid. The method 600 can insert the highest ranked symbol into any number of additional columns.

Finally, at step 605, the remaining reels are populated with symbols and the game 80 is evaluated within grid 90.

In another aspect of the present invention, the method further includes the step of selecting the symbols within the grid from a subset of available symbols. The subset of available symbols may be all symbols available to the gaming controller 16 during a main game 80 or a special subset that is only accessible for the expanding and replication of symbols.

In another aspect of the present invention, the method 600 further includes the step of determining the symbol ranking as a function of a symbol's number and/or suit. The ranking can follow any preprogrammed ranking depending on the numerical value granted to the symbol 88.

In another aspect of the present invention, the method 600 further includes the step of dynamically allocating the symbol ranking. As non-limiting examples, the dynamic allocation step can occur in response to a trigger condition, after every spin, or upon the initiating of a new game by the player. A trigger condition may include a predetermined combination of game symbols 88, a predetermined signal from the gaming controller 16 or the system controller 202, or any non-limiting combination of these elements. Dynamically allocating the symbol ranking can allow the gaming machine 10 to utilize multiple ranking schemes and therefore change the mechanics of game play.

In another aspect of the present invention, as shown in FIG. 7, the display device 12 further includes a second grid of symbol positions, the second grid defining a second plurality of columns, and the method 700 further includes the step of inserting the highest ranked symbol into one of the columns of the second grid, the one of the columns of the second grid corresponding with one of the columns of the first grid. It should be noted that in the illustrated embodiment the highest ranked symbol and replicated column corresponds between the first and second grids. Such a corresponding relationship is not limited to two grids or between a first grid and any later grids within a game 80. It should be noted that also the embodiment shows the highest ranked symbol being pulled from the first (or top) grid and then replicated into all grids, the present invention may determine the highest ranked symbol from any symbol position within any grid that is active for determining the highest ranked symbol 88 during the game 80.

The method 700, as shown in FIG. 7, outlines an embodiment of the present invention that uses dependent reels in order to expand one high-ranked symbol during game play. The method 700 begins at step 701 with at least one of the reels 98 within each of the active grids stopping in order to show the symbols 88 present within the grid 90.

Next, at step 702, the gaming controller 16 determines the highest ranked symbol within one column from each of the current grids 90. As shown in this example, the highest-ranked symbol determined by the gaming controller 16 is the "Pic-a". The "Pic-a" will then be used throughout the remainder of the method 700.

Then, at step 703, the "Pic-a" symbol, (i.e., the highest ranked symbol,) is replicated into every symbol position within the initial columns used by each grid 90 to make the ranking determination at step 702. Now each grid 90 has one complete column possessing the "Pic-a" symbol as the remaining reels continue to spin.

Next, at step 704, the completed "Pic-a" column is replicated onto at least one additional column with each grid 90. The particular column that is consumed by the highest-ranked symbol can differ between the grids 90 and each grid 90 may also have a different number of additional replicated columns.

Finally, at step 705, the remaining reels 98 are populated with symbols and the game 80 is evaluated based on the result within each perspective grid 90.

In another aspect of the present invention, the method 700 further includes the step of replacing at least one additional column within the second grid 90 with the highest ranked symbol in the first column of the first grid 90.

In another aspect of the present invention, as shown in FIG. 8, the method 800 outlines an embodiment of the present invention that uses independent reels 98 in order to expand multiple high-ranked symbols during game 80 play. Initially the method 800 begins by determining the symbols displayed within the second grid 90 along a first column. Next, the method 800 evaluates the symbols 88 displayed within the first column of the second grid 90 to determine the highest ranked symbol in the first column of the second grid 90. Then the method 800 replaces all remaining symbols displayed within the first column of the second grid 90 with the highest ranked symbol in the first column of the second grid 90 and then replaced at least one additional column in the second grid 90 with the highest ranked symbol in the first column of the second grid 90. Finally, the method 800 completes the grid 90 of symbols in both the first grid 90 and the second grid 90 in order to determine a payout.

The method 800, as shown in FIG. 8, outlines an embodiment of the present invention that uses independent reels 98 in order to expand multiple high-ranked symbols during game 80 play. The method 800 begins at step 801 with at least one of the reels 98 within each of the active grids 90 stopping in order to show the symbols 88 present within the grid 90.

Next, at step 802, the gaming controller 16 determines the highest ranked symbol within the first column within each of the perspective grids 90. As shown in this example, the highest-ranked symbol determined by the gaming controller 16 is the "Pic-c" in the first column of the first grid 90 and the "Pic-a" in the first column of the second grid 90. It should be noted that the first column may be any of the columns present within the grids that are active during the game 80. Both of these symbols will then be used throughout the remainder of the method 800.

Then, at step 803, the highest ranked symbols are replicated into every symbol position within the initial columns used by each grid 90. Now each grid 90 has one complete column possessing their perspective highest-ranked symbol as the remaining reels 98 continue to spin.

Next, at step 804, the completed column is replicated onto at least one additional column with each perspective grid 90. Which additional column is consumed by the highest-ranked symbol can differ between the grids 90 and each grids 90 may also have a different number of additional replicated columns.

Finally, at step 805, the remaining reels 98 are populated with symbols and the game is evaluated based on the result within each perspective grid 90.

In another aspect of the present invention, the method 800 further includes the step of replacing at least one additional column within the second grid 90 with the highest ranked symbol in the first column of the first grid 90.

In another aspect of the present invention, a non-transitory information recording medium containing a computer readable program that functions as a game machine is provided. The machine comprises a display and a controller. The display is configured to display a plurality of symbol positions displayed in a grid, the grid defining a plurality of columns. The controller is configured to: initiate a game; determine at least one symbol associated with each of the plurality of symbol positions along at least one of the columns and display the symbols in the at least one column; evaluate the symbols displayed within the at least one the columns to determine a highest ranked symbol; replace all remaining symbols displayed within the at least one column with the highest ranked symbol; and insert the highest ranked symbol into the symbol positions of at least one other column within the grid.

Exemplary embodiments of a gaming machine, a gaming system, and a method of allowing a player to play a gaming machine are described above in detail. The gaming machine, system, and method are not limited to the specific embodiments described herein, but rather, components of the gaming machine and/or system and/or steps of the method may be utilized independently and separately from other components and/or steps described herein. For example, the gaming machine may also be used in combination with other gaming systems and methods, and is not limited to practice with only the gaming machine as described herein. Rather, an exemplary embodiment can be implemented and utilized in connection with many other gaming system applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A game machine, comprising:

a wager input device configured to accept physical media indicating a monetary value to establish a credit balance;

a display configured to display a game including a grid being displayed with a plurality of symbol positions and a plurality of reels being displayed in the grid, the grid defining a plurality of columns, each reel including a plurality of symbols and being displayed in a corresponding column; and a controller, the controller configured to:

receive a signal from the wager input device indicating a wager being received from the player and adjust the credit balance by an amount of the wager;

initiate a game in response to the wager and responsively spin the plurality of reels;

select a first reel of the plurality of reels and stop the selected first reel to display corresponding symbols in each of the plurality of symbol positions in a corresponding first column displaying the first reel;

evaluate the symbols displayed within the first column to determine a highest ranked symbol being displayed within the first column;

replace all remaining symbols displayed within the first column with the highest ranked symbol;

randomly select a second column of the plurality of columns and insert the highest ranked symbol into the symbol positions of the selected second column within the grid;

stop the remaining reels to display an outcome of the game; and evaluate the outcome of the game, provide an award to the player based on the outcome of the game, and adjust the credit balance as a function of the outcome of the game and the wager.

2. The game machine, as in claim 1, wherein the symbols within the grid are selected from a subset of available symbols, the controller configured to determine a symbol ranking of symbols included in the subset of available symbols upon initiating the game in response to receiving the wager.

3. The game machine, as in claim 1, wherein the symbol ranking is predetermined as a function of the symbols number or suit.

4. The game machine, as in claim 1, wherein the symbol ranking is dynamically allocated, the controller configured to randomly determine a ranking of the symbols prior to each game being initiated.

5. The game machine, as in claim 1, the display further including a second grid of symbol positions, the second grid defining a second plurality of columns, the controller further configured to:

insert the highest ranked symbol into one of the columns of the second grid, the one of the columns of the second grid corresponding with the first column of the first grid.

6. The game machine, as in claim 1, the controller further configured to:

display a second grid of symbol positions including a second plurality of columns and a second plurality of reels associated with each of the second plurality of columns;

spin the second plurality of reels to initiate the game;

select a reel of the second plurality of reels corresponding to the selected first reel of the first grid and stop the selected reel of the second plurality of reels;

determine the symbols displayed by the selected reel of the second plurality of reels within the second grid along a corresponding first column of the second grid;

evaluate the symbols displayed within the first column of the second grid to determine the highest ranked symbol in the first column of the second grid;

replace all remaining symbols displayed within the first column of the second grid with the highest ranked symbol in the first column of the second grid;

replace at least one additional column in the second grid with the highest ranked symbol in the first column of the second grid;

complete the grid of symbols in both the first grid and the second grid; and evaluate the game result.

7. The game machine, as in claim 5, the controller further configured to replace at least one additional column within the second grid with the highest ranked symbol in the first column of the first grid.

8. The game machine, as in claim 6, the controller further configured to replace at least one additional column within the second grid with the highest ranked symbol in the first column of the first grid.

9. A method of implementing a game machine including a wager input device configured to a receive a wager from a user and for accepting physical media indicating a monetary value to establish a credit balance, a display configured to display a plurality of symbol positions displayed in a grid, the grid defining a plurality of columns, and a controller, the method comprising the steps of the controller:

displaying a game including a plurality of reels being displayed in the grid, each reel including a plurality of symbols and being displayed in a corresponding column;

receiving a signal from the wager input device indicating a wager being received from the player and adjusting the credit balance by an amount of the wager;

initiating a game in response to receiving a wager input and responsively spinning the plurality of reels;

selecting a first reel of the plurality of reels and stopping the selected first reel to display corresponding symbols in a corresponding first column displaying the first reel;

evaluating the symbols displayed within the first column to determine a highest ranked symbol being displayed within the first column;

replacing all remaining symbols displayed within the first column with the highest ranked symbol;

randomly selecting a second column of the plurality of columns and inserting the highest ranked symbol into the symbol positions of the selected second column within the grid stopping the remaining reels to display an outcome of the game; and evaluating the outcome of the game, providing an award to the player based on the outcome of the game, and adjusting the credit balance as a function of the outcome of the game and the wager.

10. The method, as in claim 9, further including the step of selecting the symbols within the grid from a subset of available symbols and determining a symbol ranking of symbols included in the subset of available symbols upon initiating the game in response to receiving the wager.

11. The method, as in claim 9, further including the step of determining the symbol ranking as a function of the symbol number and/or suit.

12. The method, as in claim 9, further including the step of dynamically allocating the symbol ranking and randomly determining a ranking of the symbols prior to each game being initiated.

13. The method, as in claim 9, the display further including a second grid of symbol positions, the second grid defining a second plurality of columns, and further including the step of inserting the highest ranked symbol into one of the columns of the second grid, the one of the columns of the second grid corresponding with the first column of the first grid.

14. The method, as in claim 9, and further including the steps of:

displaying a second grid of symbol positions including a second plurality of columns and a second plurality of reels associated with each of the second plurality of columns;

spinning the second plurality of reels to initiate the game;

selecting a reel of the second plurality of reels corresponding to the selected first reel of the first grid and stop the selected reel of the second plurality of reels;

determining the symbols displayed by the selected reel of the second plurality of reels within the second grid along a corresponding first column of the second grid;

evaluating the symbols displayed within the first column of the second grid to determine the highest ranked symbol in the first column of the second grid;

replacing all remaining symbols displayed within the first column of the second grid with the highest ranked symbol in the first column of the second grid;

replacing at least one additional column in the second grid with the highest ranked symbol in the first column of the second grid; and completing the grid of symbols in both the first grid and the second grid.

15. The method, as in claim 13, further including the step of replacing at least one additional column within the second grid with the highest ranked symbol in the first column of the first grid.

16. The method, as in claim 14, further including the step of replacing at least one additional column within the second grid with the highest ranked symbol in the first column of the first grid.

17. A non-transitory information recording medium containing a computer readable program that functions as a game machine comprising:

a wager input device configured to accept physical media indicating a monetary value to establish a credit balance;

a display configured to display a game including a grid being displayed with a plurality of symbol positions and a plurality of reels being displayed in the grid, the grid defining a plurality of columns, each reel including a plurality of symbols and being displayed in a corresponding column; and a controller, the controller configured to:

receive a signal from the wager input device indicating a wager being received from the player and adjust the credit balance by an amount of the wager;

initiate a game in response to the wager and responsively spin the plurality of reels;

select a first reel of the plurality of reels and stop the selected first reel to display corresponding symbols in each of the plurality of symbol positions in a corresponding first column displaying the first reel;

evaluate the symbols displayed within the first column to determine a highest ranked symbol being displayed within the first column;

replace all remaining symbols displayed within the first column with the highest ranked symbol;

randomly select a second column of the plurality of columns and insert the highest ranked symbol into the symbol positions of selected second column within the grid;

stop the remaining reels to display an outcome of the game; and evaluate the outcome of the game, provide an award to the player based on the outcome of the game, and adjust the credit balance as a function of the outcome of the game and the wager.

* * * * *